United States Patent

Schoenherr et al.

[11] Patent Number: 5,910,558
[45] Date of Patent: Jun. 8, 1999

[54] MICROPOWDERS

[75] Inventors: Michael Schoenherr, Frankenthal; Juergen Ahlers, Gross-Rohrheim; Hermann Buchert, Bad Duerkheim, all of Germany

[73] Assignee: BASF Aktiengesellschaft, Ludwigshafen, Germany

[21] Appl. No.: 08/897,686

[22] Filed: Jul. 21, 1997

Related U.S. Application Data

[62] Division of application No. 08/693,563, Aug. 7, 1996, abandoned, and a continuation of application No. 08/454,147, filed as application No. PCT/EP94/00007, Jan. 4, 1994, abandoned.

[30] Foreign Application Priority Data

Jan. 8, 1993 [DE] Germany .......................... P 43 00 326
Jan. 21, 1993 [DE] Germany .......................... P 43 01 543

[51] Int. Cl.⁶ .............................. C08G 8/02; C08G 75/20; C08K 7/16
[52] U.S. Cl. ........................ 528/125; 528/128; 528/171; 528/391; 528/480; 528/501; 528/502; 523/223
[58] Field of Search ................... 528/125, 128, 528/171, 391, 480, 501, 502; 523/223

[56] References Cited

U.S. PATENT DOCUMENTS

| | | | |
|---|---|---|---|
| 3,953,401 | 4/1976 | Gabler et al. ............................ | 528/499 |
| 4,208,508 | 6/1980 | Hashino et al. ......................... | 528/175 |
| 4,690,786 | 9/1987 | Ninomiya et al. ....................... | 264/4.6 |
| 5,013,816 | 5/1991 | Bobbink et al. ......................... | 528/125 |

FOREIGN PATENT DOCUMENTS

| | | |
|---|---|---|
| 2032921 | 7/1991 | Canada . |
| 2 403 660 | 8/1974 | Germany . |
| 2 000 720 | 1/1979 | United Kingdom . |
| 2 151 202 | 7/1985 | United Kingdom . |

Primary Examiner—Tae Yoon
Attorney, Agent, or Firm—Keil & Weinkauf

[57] ABSTRACT

Micropowders having spherical particles possessing an essentially smooth surface structure contain, as essential components, polyarylene ether sulfones or polyarylene ether ketones and are obtainable by prilling melts thereof or spray-drying solutions thereof.

19 Claims, 5 Drawing Sheets

25089201
Vergr. 530:1

Vergr. 1000:1

MICROPOWDERS

This application is a division of application Ser. No. 08/693,563, filed on Aug. 7, 1996, now abandoned and is a continuation of application Ser. No. 08/454,147, filed on Jun. 9, 1995 now abandoned which is a national stage entry of PCT/EP94/00007, filed Jan. 04, 1994.

The present invention relates to micropowders which have spherical particles possessing an essentially smooth surface structure, contain polyarylene ether sulfones or polyarylene ether ketones as essential components and are obtainable by prilling melts or spray-drying their solutions. The present invention furthermore relates to a process for the preparation of these micropowders and to the use thereof. The present invention also relates to aqueous dispersions which contain the micropowders and to coatings produced therefrom.

Micropowders based on polyarylene ether sulfones or polyarylene ether ketones are known per se and are used, for example, as adhesion promoters between metallic surfaces and polytetrafluoroethylene, for example for producing coatings having a nonadhesive effect and good sliding behavior (cf. for example GB 1 426 342). Such known micropowders are obtained by rendering the substrates brittle by cooling and then milling them (cf. for example EP-A2-377 170). WO 91/00876 discloses that micropowders of polyarylene ether sulfones are also obtainable by processing the polyarylene ether sulfones with a liquid to give a paste, emulsifying the latter in water with vigorous stirring and drying the emulsion. The micropowders obtainable by milling all have irregular angular surfaces. For example, this has an adverse effect on the flow and the bulk density of the powders and on the behavior of the powders in the fluidized bed. Moreover, surfaces cannot be very uniformly coated, as is required for many intended uses. The micropowders prepared from an emulsion with the action of a shear gradient contain oval to elongated particles which, like the milled particles, are not arranged satisfactorily on the surface to be coated. GB-A 2 151 202 disclosed that microcapsules which consist of an oily substance enclosed by walls of polysulfone can be prepared by spraying corresponding solutions by means of a pressure nozzle. Since certain applications require particles having a very smooth surface structure, neither the particles obtained from the emulsion nor the microcapsules meet these requirements. Furthermore, EP-A2-441 047 states that small particles having a porous surface are obtained if solutions of amorphous thermoplastics, such as polyarylene ether sulfones, are spray-dried.

It is an object of the present invention to provide micropowders which are based on polyarylene ether sulfones or polyarylene ether ketones and which consist of spherical particles having a regular surface.

We have found that this object is achieved by the novel micropowders.

The novel micropowders contain, as essential components, polyarylene ether sulfones or polyarylene ether ketones. They may of course also contain mixtures of polyarylene ether sulfones and polyarylene ether ketones. Surprisingly, the novel micropowders are obtainable by melting or dissolving the polyarylene ether sulfones or polyarylene ether ketones or reducing their viscosity by means of a suitable liquid and then prilling or spray-drying them.

According to the invention, the particles thus obtainable are regular and round and have a virtually poreless surface. The volume average particle diameter is as a rule 1 μm or more. It may also be less but it is in general not less than 0.5 μm. In general, the average particle diameters may be up to 80 μm. It is also possible for them to be slightly larger, for example 100 μm. Larger average particle diameters are generally of no interest for most applications, in particular for the preparation of aqueous dispersions. The average particle diameter is preferably from 2 to 70 μm, particularly preferably from 2 to 50 μm, for example from 5 to 50 μm, very particularly preferably from 1 to 20 μm, in particular from 1 to 10 μm. The particles are essentially solid, ie. they are not hollow and generally have the density of the polyarylene ether sulfones or polyarylene ether ketones on which they are based. However, the density of the particles may also be slightly below this, for example if small amounts of gas are enclosed.

The novel micropowders have a narrow particle size distribution. The relative span factor A may be stated as a measure of the width of the particle size distribution (cf. A. H. Lefebvre: Atomization and Sprays, Hemisphere Publishing Corporation, 1989, page 100, equation 3.40). The relative span factor of the novel micropowders is in general from 1 to 2. However, it may be above this but in general is not more than 2.5. The span factors are preferably up to about 1.5, very particularly preferably less than 1.

The novel micropowders contain, as essential components A, polyarylene ether sulfones or polyarylene ether ketones. These contain repeating units I

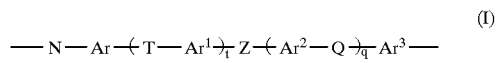

(I)

t and q independently of one another may be identical or different and are each 0 or an integer from 1 to 3. N is either —O— or —S—, preferably —O—. T and Q independently of one another may be identical or different. They may be a chemical bond or a group selected from —O—, —S—, C=O, S=O, —SO$_2$—, —N=N—, —R$^a$C=CR$^b$— and —CR$^c$R$^d$. Among these, —O—, C=O, —SO$_2$— and —CR$^c$R$^d$— are particularly preferred. T and Q are preferably also a chemical bond. R$^a$ to R$^d$ independently of one another may be identical or different and may each be either hydrogen or C$_1$–C$_{10}$-alkyl, such as methyl, ethyl, propyl or tert-butyl, preferably hydrogen or methyl. Furthermore, R$^c$ and R$^d$ may also be C$_{1-C_{10}}$-alkoxy, C$_1$–C$_{10}$-alkylaryl or C$_6$–C$_{18}$-aryl. The preferred groups include methoxy, ethoxy, propoxy, tert-butoxy, benzyl and phenyl. The abovementioned groups may each furthermore be substituted by fluorine and/or chlorine. Examples are trifluoromethyl and p-chlorophenyl. According to the invention, Z is a group selected from C=O, S=O and —SO$_2$—, C=O and —SO$_2$— being particularly preferred. Ar to Ar$^3$ independently of one another may have the same meanings or may differ from one another. According to the invention, they are each C$_6$–C$_{18}$-aryl. These include phenyl, biphenyl and naphthyl. The aryl groups are preferably unsubstituted but may have substituents selected from the group consisting of C$_1$–C$_{10}$-alkyl, C$_1$-C$_{10}$-alkylaryl, C$_6$–C$_{18}$-aryl, C$_1$–C$_{10}$-alkoxy and halogen. Examples of suitable substituents are methyl, ethyl, propyl, isopropyl, n-butyl, isopentyl, n-hexyl, methoxy, ethoxy, propoxy, butoxy, benzyl, ethylphenyl, phenyl, fluorine and chlorine.

Some of the preferred repeating units I are listed below:

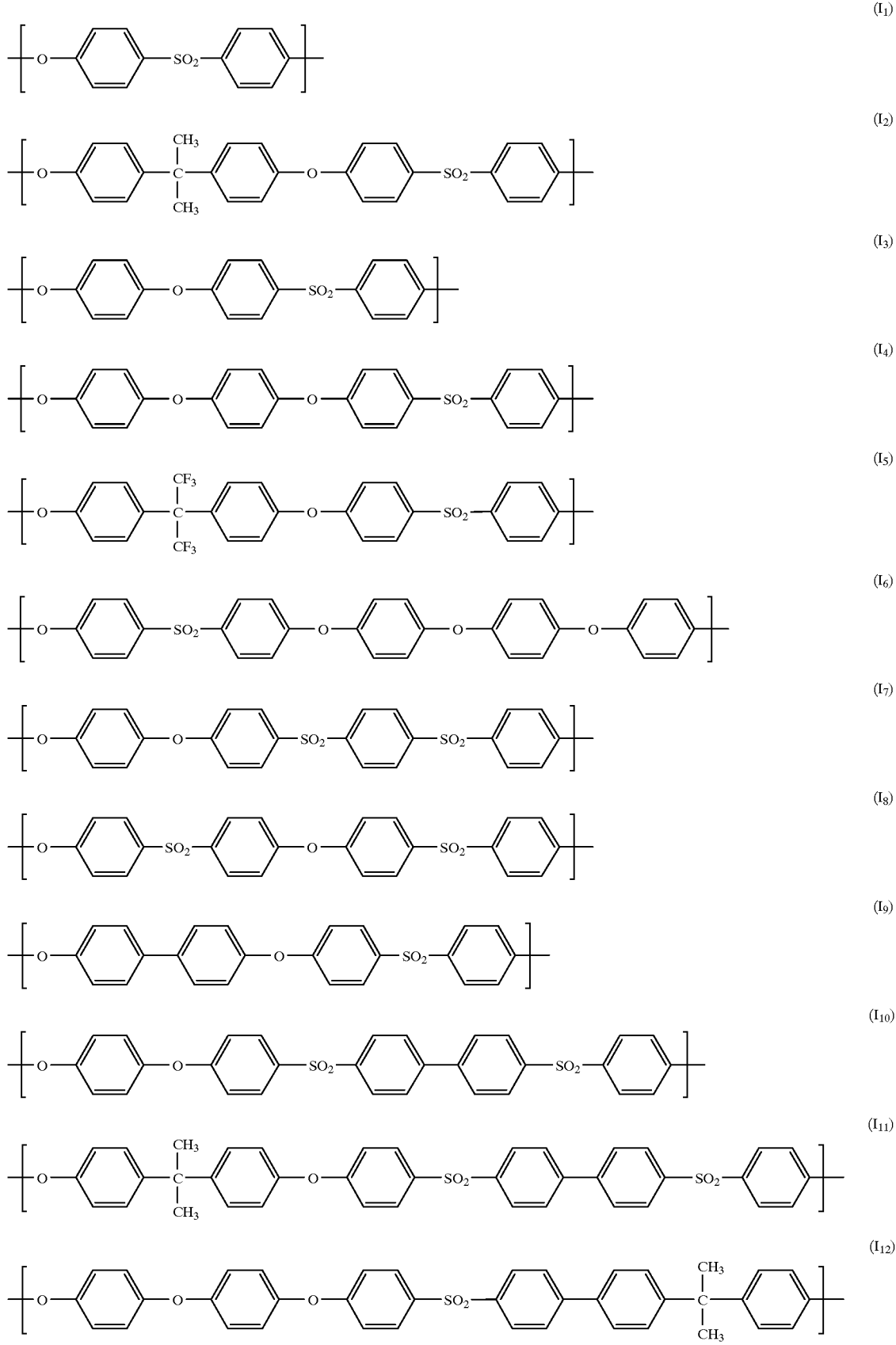

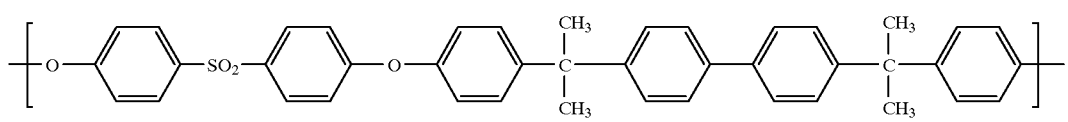
(I₁₃)
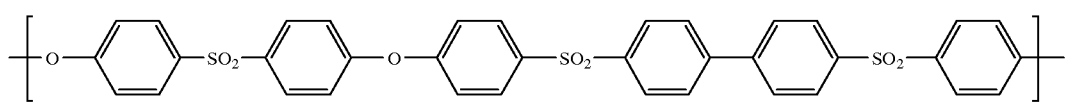
(I₁₄)
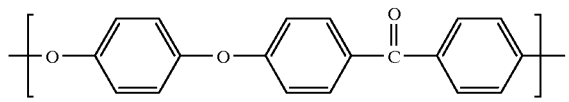
(I₁₅)
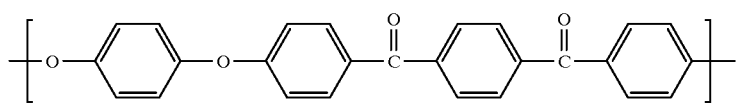
(I₁₆)
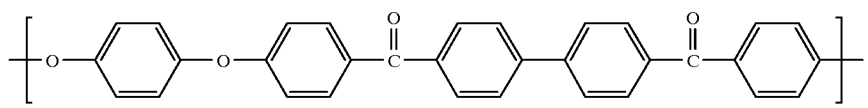
(I₁₇)
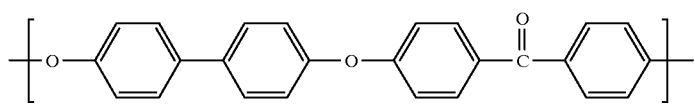
(I₁₈)
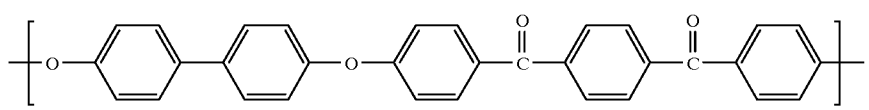
(I₁₉)
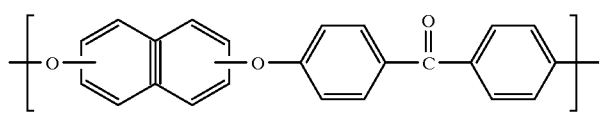
(I₂₀)
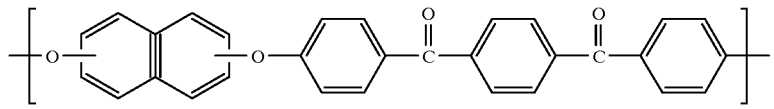
(I₂₁)
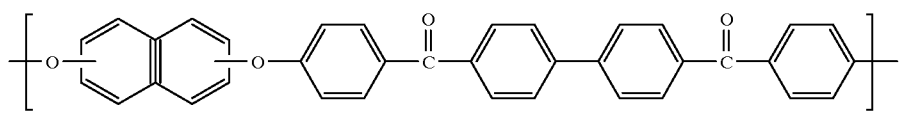
(I₂₂)
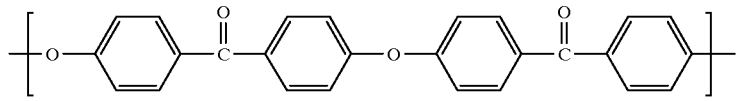
(I₂₃)
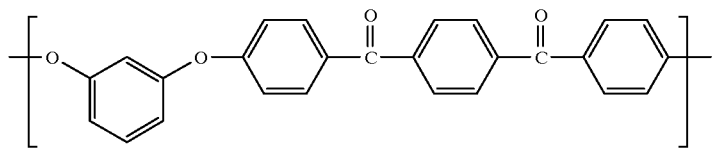
(I₂₄)

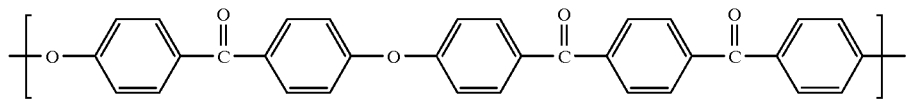 (I$_{25}$)

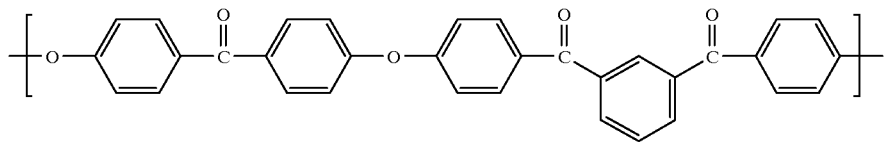 (I$_{26}$)

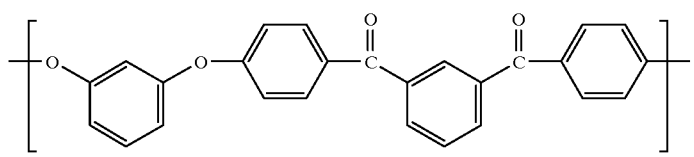 (I$_{27}$)

Very particularly preferred micropowders are those which contain, as essential components A, polyarylene ether sulfones or polyarylene ether ketones having structural units (I$_1$), (I$_2$), (I$_{25}$) or (I$_{26}$). These include, for example, micropowders which contain, as essential components A, polyarylene ether sulfones having from 0 to 100, preferably from 5 to 95, mol % of structural units (I$_1$) and from 0 to 100, preferably from 5 to 95, mol % of structural units (I$_2$).

The polyarylene ether sulfones or polyarylene ether ketones may furthermore be copolymers or block copolymers in which polyarylene ether segments and segments of other thermoplastic polymers, such as polyamides, polyesters, aromatic polycarbonates, polyester carbonates, polysiloxanes, polyimides or polyether imides, are present. The molecular weights of the blocks or of the grafts in the copolymers are as a rule from 1000 to 30,000 g/mol. The blocks having different structures may be arranged alternately or randomly. The amount by weight of the polyarylene ether sulfones or polyarylene ether ketones in the copolymers or block copolymers is in general at least 3, preferably at least 10, % by weight and may be up to 97% by weight. Preferred copolymers or block copolymers are those containing up to 90% by weight of polyarylene ether sulfones or polyarylene ether ketones. Copolymers or block copolymers containing from 20 to 80% by weight of polyarylene ethers are particularly preferred.

The polyarylene ether sulfones or polyarylene ether ketones may contain any terminal groups, for example halogen, methoxy, benzyloxy, phenoxy or amino. Preferred terminal groups are halogen and methoxy.

In general, the polyarylene ether sulfones or polyarylene ether ketones have number average molecular weights $M_n$ from 15,000 to 60,000 g/mol and relative viscosities of from 0.25 to 0.95 dl/g. Depending on the solubility of the polyarylene ether sulfones or polyarylene ether ketones, the relative viscosities are measured either in 1% strength by weight N-methylpyrrolidone solution, in a mixture of phenol and dichloromethane or in 96% strength sulfuric acid, in each case at 20° C. and 25° C.

The polyarylene ether sulfones or polyarylene ether ketones which are suitable as component A are known per se and can be prepared by methods which are known per se. Polyarylene ether sulfones or polyarylene ether ketones are formed, for example, by condensation of aromatic bishalogen compounds and the alkali metal double salts of aromatic bisphenols. They can also be prepared, for example, by autocondensation of alkali metal salts of aromatic halophenols in the presence of a catalyst. DE-A-38 43 438 gives, for example, a detailed list of suitable monomers. Suitable processes are described, inter alia, in U.S. Pat. Nos. 3,441, 538 and 4,108,837, DE-A1-27 38 962 and EP-A1-361. Polyarylene ether ketones are also obtainable by electrophilic (Friedel-Crafts) polycondensation, as described, inter alia, in WO 84/03892. For the formation of carbonyl bridges in electrophilic polycondensation, either dicarbonyl chlorides or phosgene are reacted with aromatics which contain two hydrogen atoms replaceable by electrophilic substituents, or an aromatic carbonyl chloride which contains both an acyl chloride group and a substitutable hydrogen atom is subjected to autopolycondensation.

Preferred process conditions for the synthesis of polyarylene ether sulfones or polyarylene ether ketones are described, for example, in EP-A-113 112 and 135 130. The reaction of the monomers in aprotic solvents, in particular N-methylpyrrolidone, in the presence of an anhydrous alkali metal carbonate, in particular potassium carbonate, is particularly suitable. Reacting the monomers in the melt has also proven advantageous in many cases.

According to the invention, the micropowders may contain, as essential components B, polyarylene ether sulfones or polyarylene ether ketones which are obtainable by reacting a polyarylene ether sulfone or polyarylene ether ketone A with a reactive compound. The reactive compounds contain, in addition to a C—C double or triple bond, one or more carbonyl, carboxyl, carboxylate, anhydride, amide, carboxylic ester, amino, hydroxyl, epoxy, oxazoline, urethane, urea, lactam or halobenzyl groups.

Typical suitable compounds are, for example, maleic acid, methylmaleic acid, itaconic acid, tetrahydrophthalic acid, their anhydrides and imides, fumaric acid, the mono- and diesters of these acids, for example of $C_1$–$C_{18}$-alkanols, and the mono- or diamides of these acids, such as N-phenylmaleimide or maleic hydrazide.

α,β-unsaturated dicarboxylic acids and their anhydrides, diesters and monoesters having the following general structures IV and V

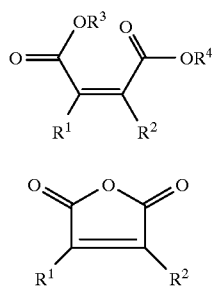

where $R^1, R^2, R^3$ and $R^4$ independently of one another may each be hydrogen or $C_1$–$C_{18}$-alkyl, are preferably used.

Particularly suitable compounds are maleic anhydride, fumaric acid and itaconic acid.

The polymers and the reactive compound can be reacted with one another, for example, in an aromatic solvent. Solvents which have proven particularly suitable are chlorobenzene, o-dichlorobenzene and N-methylpyrrolidone. In general, a conventional theoretical initiator is used. The reaction is carried out in general at 75–150° C. The reaction product is obtained by precipitation with a conventional precipitating agent, such as a low molecular weight alcohol or ketone, or by removing the solvent (for example in a devolatilization extruder or thin-film evaporator).

However, the reactants may also be reacted at, for example, 270–350° C. in the melt in a continuous or batchwise mixing unit (for example a single-screw or twin-screw extruder or a kneader).

The reactive compound is preferably metered in liquid form into the melt of the polymer, in particular within the kneading zone of a mixing unit.

Modified polyarylene ether sulfones or polyarylene ether ketones A which have been obtained by reacting from 80 to 99.9, in particular from 90 to 99, % by weight of the unmodified polyarylene ether sulfones or polyarylene ether ketones A with from 0.1 to 20, in particular from 1 to 10, % by weight of the reactive compound are preferably used as polyarylene ether sulfones or polyarylene ether ketones B in the novel micropowders.

Polyarylene ether sulfones grafted with from 0.1 to 1.5% by weight of maleic anhydride are particularly preferred as component B. Polyarylene ether sulfones containing from 5 to 95 mol % of units $I_1$ and from 5 to 95 mol % of units $I_2$ are preferred.

Polyarylene ether sulfones having from 80 to 95, preferably from 85 to 95, mol % of units of the formulae $I_2$ and $I_1$ and accordingly from 5 to 20, preferably from 5 to 15, mol % of units of the formulae $I_1$ and $I_2$, respectively, may be mentioned in particular here.

The compounds described in the technical literature (eg. J. K. Kochi, Free Radicals, J. Wiley, New York, 1973) may as a rule be used as free radical initiators.

The free radical initiators are usually used in amounts of from about 0.01 to about 1% by weight, based on the polyarylene ether sulfones or polyarylene ether ketones A employed. Mixtures of different free radical initiators may of course also be used.

According to the invention, the micropowders may also contain mixtures of the components A and B. In addition to the essential components, the micropowders may also contain, for example, up to 40% by weight of further additives, such as flameproofing agents, colorants or stabilizers.

The spray-drying of the polyarylene ether sulfones or polyarylene ether ketones is carried out by atomizing the melts or solutions into a gas which is inert under the process conditions, such as air or nitrogen. The polyarylene ether sulfones or polyarylene ether ketones are preferably dissolved in a solvent before being sprayed.

Suitable solvents are dipolar aprotic liquids. The suitable solvents include N-substituted amides, sulfoxides and sulfones. Examples are N,N-dimethylformamide, N,N-dimethylacetamide, N-methylpyrrolidone, dimethyl sulfone, tetramethylene sulfone (sulfolane) and diphenyl sulfone. Among these, N-methylpyrrolidone, dimethyl sulfoxide and dimethylformamide are particularly preferred. Diphenyl sulfone, ditolyl sulfone and trifluoroacetic acid are especially suitable solvents for particularly sparingly soluble polyarylene ether ketones.

Either the atomization temperature can be chosen so that the melt or the solution has the viscosity suitable for atomization or the solids content of the solution can be chosen so that the solution has the suitable viscosity at a certain atomization temperature, the latter being preferred. The reduced viscosity of the solution at the atomization temperature is up to 8000 mPa.s. It may also be higher, for example 10,000 mPa.s. In general, solutions having higher viscosities are difficult to atomize. The reduced viscosities are preferably 1000, particularly preferably from 5 to 500, in particular from 10 to 100, mPa.s.

In general, solutions which are at room temperature are atomized. In order to reduce their viscosity, it may be necessary to spray the solutions at elevated temperatures, for example at from 50 to 100° C. As a rule, however, the atomization temperatures are below the boiling point of the particular solvent.

Pneumatic atomizers, such as multimaterial nozzles, in particular two-material nozzles, may be used for atomization. Examples of these are double-flow or triple-flow two-material nozzles. In order to generate angular momentum or flow deflection, the two-material nozzles may contain baffles. These may be mounted both on the gas side and on the liquid side. It is also possible to use ultrasonic atomizers.

The ratio of mass throughput of atomizing gas to mass throughput of liquid is in general greater than 2, particularly advantageously from 3 to 10. As a rule, gas pressures of 5 bar or more are required. A gas pressure of more than 100 bar is rarely necessary. In general, the gas pressures are from 10 to 70 bar.

After the atomization, the liquid droplets can be dried in a drying chamber, for example in a spray tower of known design (cf. for example K. Masters: Spray Drying Handbook, Leonhard Hill Books, London 1972). The solvent can be evaporated either at atmospheric pressure or at reduced pressure. The heat required for evaporating the solvent is preferably supplied at the top of the tower by means of an inert drying gas. A particularly suitable drying gas is nitrogen. However, other gases, such as carbon dioxide or air, may also be used. The gas temperature at the top of the drying tower is preferably greater than the evaporation temperature of the solvent and may be from room temperature to 500° C. In general, it is at 100° C. or more, preferably from 200 to 300° C.

The drying gas preferably flows together with the liquid droplets through the drying tower and is sucked off at the outlet of the tower together with the dry material. The gas temperature at the outlet of the tower depends on the desired residual solvent content of the powder. It may be from room temperature to slightly less than the gas temperature at the top of the drying tower. As a rule, it is 50° C. or more, for example from 120 to 170° C. In general, temperatures greater than 200° C. are not required.

The powder can in general be separated from the gas stream in a conventional manner by filters or cyclones. Filters for separating off solids are preferably used for the preparation of the novel micropowders.

The residual solvent content of the novel micropowder without subsequent drying is in general not more than 5%, in particular less than 2%. In order further to reduce the residual solvent content, the spray drying may be followed by a subsequent drying procedure, which can be combined with subsequent cooling. The subsequent drying may be carried out, for example, in a fluidized bed.

In the spray drying, it is possible concomitantly to use spray systems. Examples of spray systems are fine-particled inorganic materials, such as silica, hydrophobic silica or alumina, and in particular polytetrafluoroethylene. The spray systems are used, as a rule, in amounts of from 0.1 to 20, in particular from 1 to 5, % by weight, based on polyarylene ether sulfone or polyarylene ether ketone, calculated as 100% strength.

The novel micropowders are particularly suitable for coating surfaces. Said micropowders can preferably be used for coating metallic surfaces. The micropowders are very particularly suitable for producing surfaces having sliding properties or antiadhesion coatings for articles of all types, such as sliding bearings, household appliances or electronic components. This may be effected, for example, by means of a fluidized-bed coating process or by applying a dispersion of the micropowder. It is also possible to coat surfaces by spraying the micropowder, for example with the aid of an electrostatic field, onto the surface.

The novel micropowders may be dispersed in nonsolvents, preferably in water. The aqueous dispersions usually contain from 5 to 50, preferably from 10 to 30, % by weight of micropowder. In addition to the micropowder, the aqueous dispersions may also contain thermoplastics in dispersed form. Preferred plastics are fluorine-containing olefin polymers, in particular polytetrafluoroethylene. It is also possible to add dispersants, such as polyvinyl alcohol or glycerol, to the dispersions. The dispersions may furthermore contain flow assistants and pigments and may, for example, be sprayed or brushed onto the surface.

EXAMPLES

Determination of the particle sizes

The particle sizes were determined by means of a particle size analyzer (Helos model from Sympatec). For this purpose, 1 g of the micropowder in each case was dispersed in 100 ml of $H_2O$ with the addition of a surfactant by means of ultrasonics, and 1 ml of the dispersion thus obtained was taken and was once again dispersed in 100 ml of water. The particle sizes were measured by laser diffraction (laser diffraction particle size measuring instrument Cilas 715).

Example 1

A polyarylene ether sulfone containing essentially repeating units $I_1$

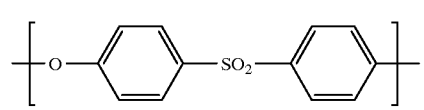

(I₁)

and having a viscosity number of 52 ml/g (measured in a 1% strength by weight solution in 1:1 phenol/1,2-dichlorobenzene at 25° C.) and a volume flow index of 140 ml/10 min (measured at 360° C.) was used. A 10% strength by weight solution of this polyarylene ether sulfone in N-methylpyrrolidone was prepared. This solution, which had a reduced viscosity of 50 mPa.s, was atomized at 25° C. in an ultrasonic atomizer (US 1, type 7/0.017.16.60 from Lechler). The drying chamber used was a drying tower having a diameter of 20 cm and a length of 2 m. The nitrogen used as drying gas was at 205° C. at the top of the tower. The temperature at the outlet of the tower was 150° C. The throughput of the drying gas was 20 kg/h and that of the solution was 300 g/h.

Spherical particles having a smooth surface structure and a number average diameter of 20 μm were obtained. The residual solvent content of the powder was 5%. The particles are shown in FIGS. 1–3.

Example 2

A mixture of 16% by weight of the polyarylene ether sulfone described in Example 1 and N-methylpyrrolidone was prepared. This solution, which had a reduced viscosity of 200 mPa.s at room temperature, was atomized in a pneumatic two-material nozzle having a 0.5 mm liquid insert (model 970 from Schlick) at 2 bar. The liquid throughput was 300 g/h. Nitrogen at 220° C. served as the nozzle gas. The drying chamber used was the drying tower described under Example 1. Nitrogen, which was at 180° C. at the top of the drying tower, was used as the drying gas. The nitrogen temperature at the outlet of the tower was 155° C.

Spherical particles having a smooth surface and a number average diameter of 6.5 μm were obtained. 96% by weight of the micropowder comprised particles having a diameter of less than 24 μm. The relative span factor was 2.5. The particle density was 1.37 g/ml and the bulk density of the powder was 200 g/l.

Figure 1:
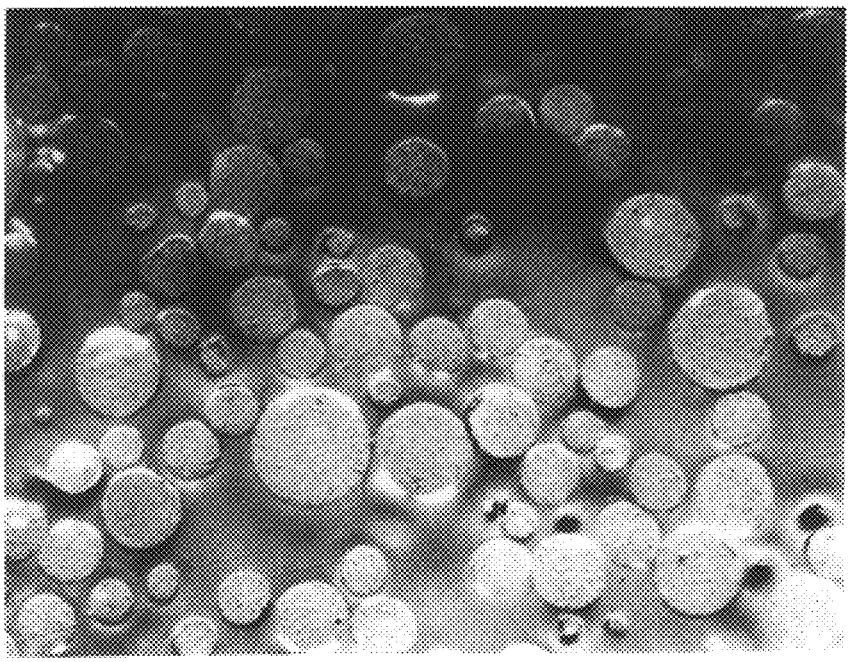
Figure 2:
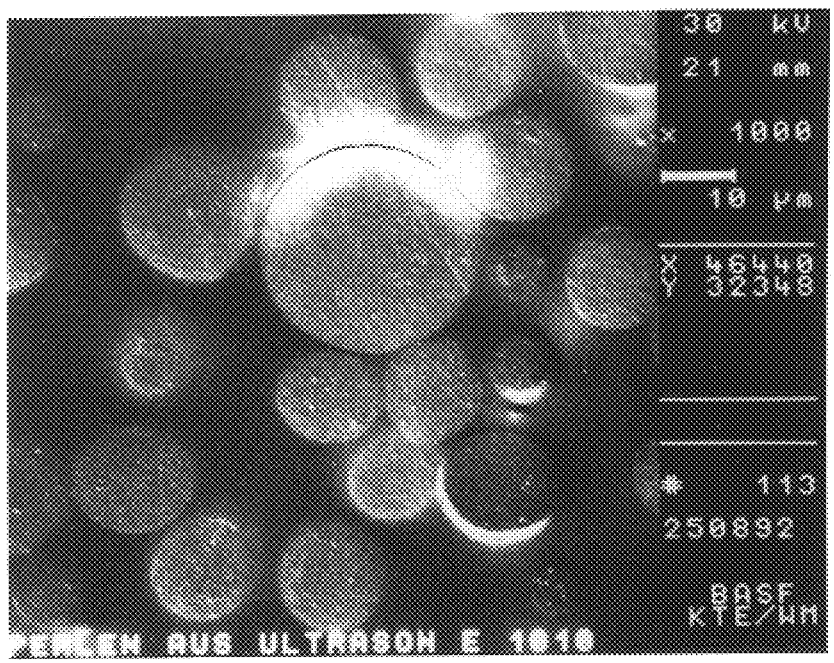
Figure 3:
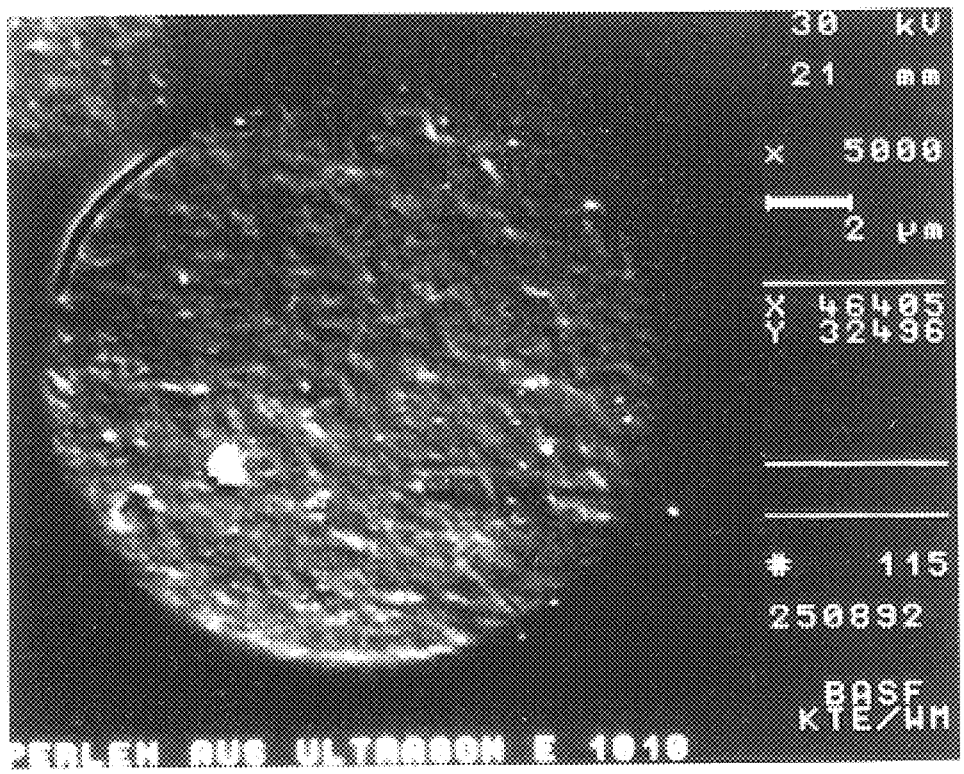
Figure 4:
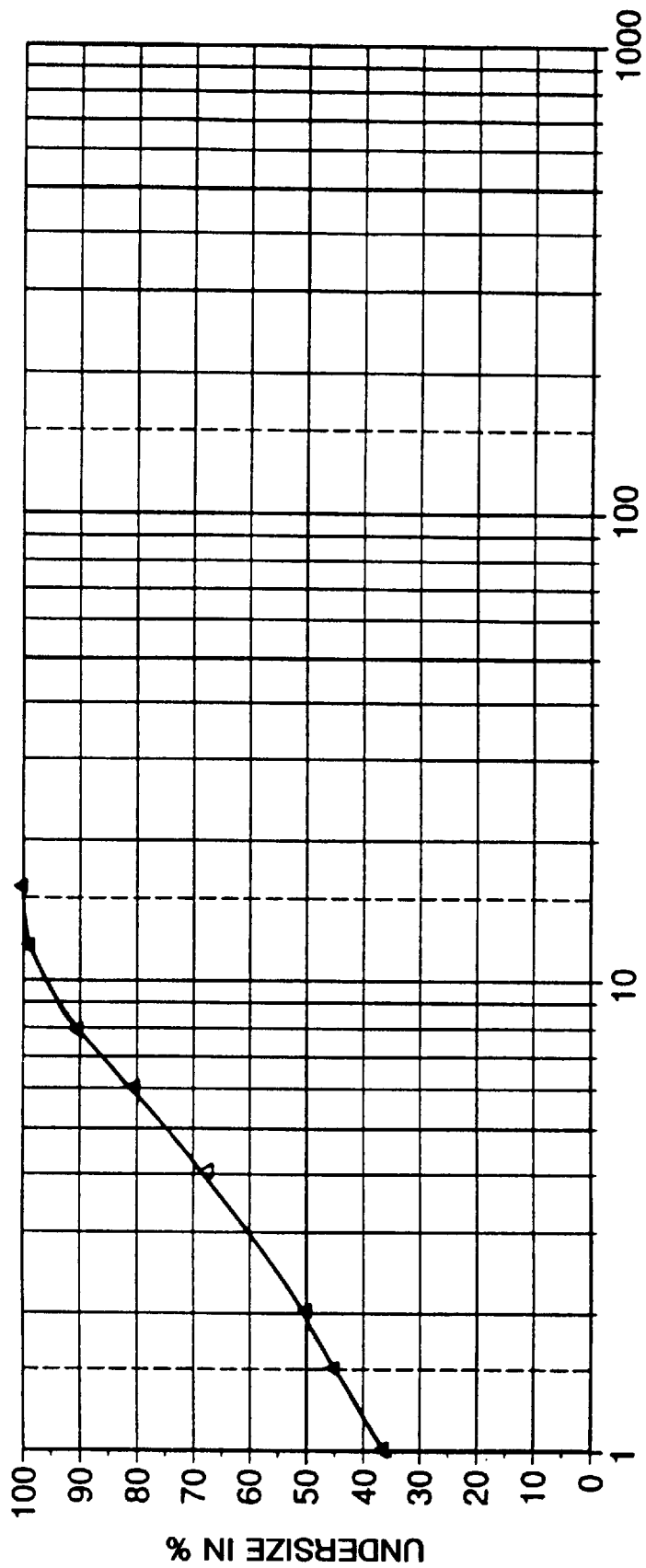
FIGS. 4 and 5 show particle size distributions as typically obtained in the case of the novel spray drying of the polyarylene ether sulfone stated under Example 1, dissolved in N-methylpyrrolidone, in further experiments.
Figure 5:
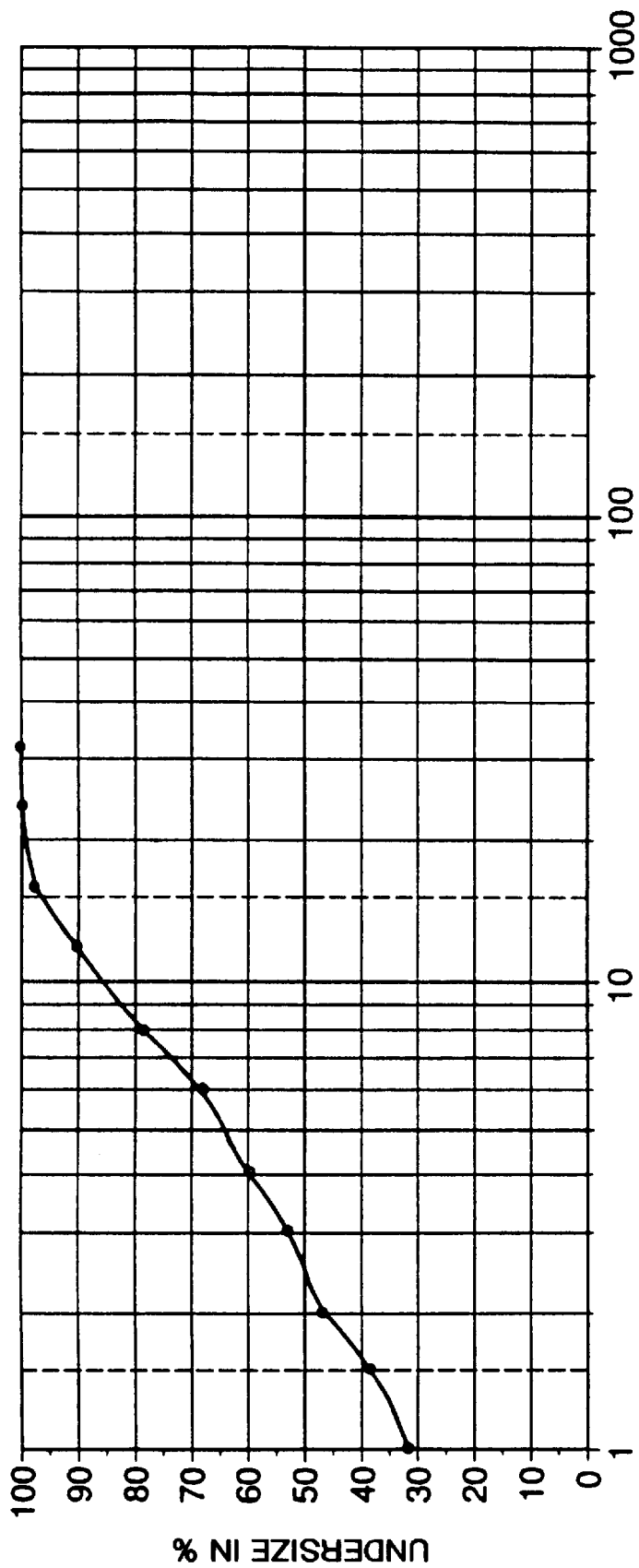
Figure 6:
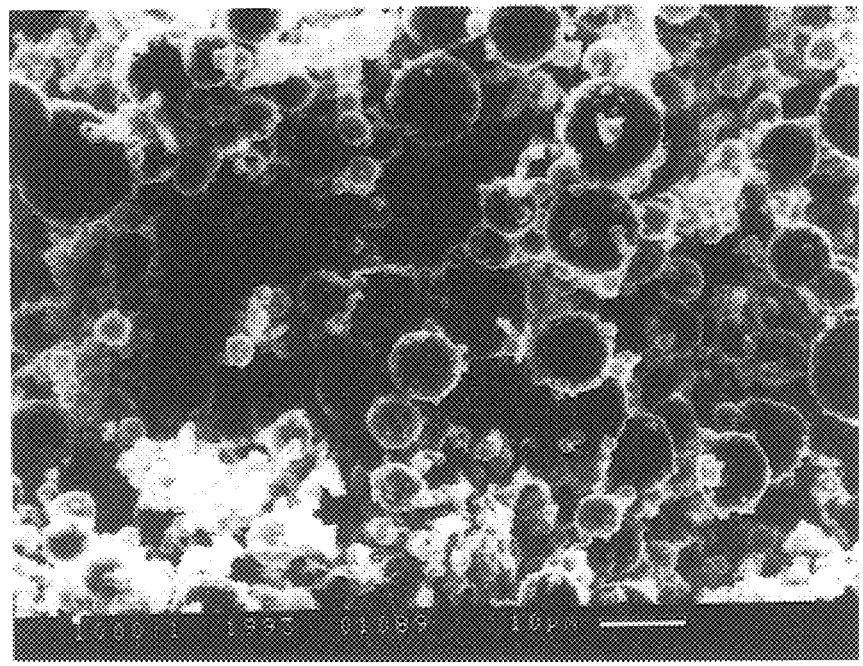
FIGS. 6 and 7 show scanning electronmicrographs of the novel micropowders typically obtained in further experiments and comprising the polyarylene ether sulfone stated under Example 1 and obtained by spray drying from N-methylpyrrolidone solutions.
Figure 7:
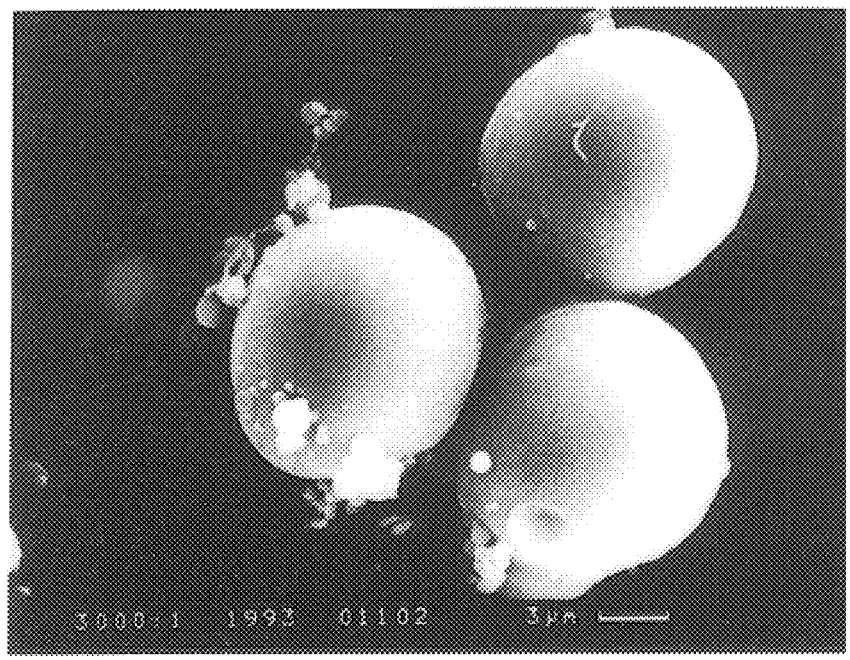

We claim:

1. A micropowder having spherical particles possessing an virtually poreless surface structure, said particles consisting essentially of a polyarylene ether sulfone or polyarylene ether ketone, and have a particle density which essentially corresponds to that of the polyarylene ether sulfone or polyarylene ether ketone, obtainable by prilling the melt thereof or spray-drying a solution thereof and wherein the polyarylene ether sulfone or polyarylene ether ketone have a number average molecular weight $M_n$ from 15,000 to 60,000 g/mol and a relative viscosity of from 0.25 to 0.95 dl/g as measured either in 1% strength by weight N-methylpyrrolidone solution, in a mixture of phenol and dichloromethane or in 96% strength sulfuric acid, in each case at 20° C. and 25° C. wherein the average particle diameter of said particles is from 2 to 70 μm.

2. A micropowder as defined in claim 1, consisting essentially of,

A) a polyarylene ether sulfone or polyarylene ether ketone containing repeating units I

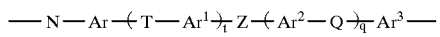

(I)

where t and q may each be 0 or an integer from 1 to 3, N may be —O— or —S—, T and Q may be a direct bond or a group selected from —O—, —S—, C=O, S=O, —SO$_2$—, —N=N—, —R$^a$C=CR$^b$— or —CR$^c$R$^d$—, R$^a$ and R$^b$ may each be hydrogen, C$_1$–C$_{10}$-alkyl, R$^c$ and R$^d$ may each be hydrogen, C$_1$–C$_{10}$-alkyl, C$_1$–C$_{10}$-alkoxy, C$_1$–C$_{10}$-alkylaryl or C$_6$–C$_{18}$-aryl, where each of the abovementioned groups may furthermore be substituted by fluorine or chlorine, Z may be a group selected from C=O, S=O and —SO$_2$— and Ar, Ar$^1$, Ar$^2$ and Ar$^3$ are each C$_6$–C$_{18}$-aryl, each of which may have substituents selected from C$_1$–C$_{10}$-alkyl, C$_1$–C$_{10}$-alkylaryl, C$_6$–C$_{18}$-aryl, C$_1$–C$_{10}$-alkoxy and halogen, or a random copolymer or block copolymer thereof or B) polyarylene ether sulfone or polyarylene ether ketone obtainable by reacting A with a reactive compound which, in addition to a C—C double or triple bond, contains one or more carbonyl, carboxyl, carboxylate, anhydride, amide, imide, carboxylic ester, amino, hydroxyl, epoxy, oxazoline, urethane, urea, lactam or halobenzyl groups, or a random copolymer or block copolymer thereof.

3. A micropowder as defined in claim 1, prepared by spray drying a polyarylene ether sulfone solution, the solvent used being N-methylpyrrolidone, dimethyl sulfoxide or dimethylformamide.

4. The microparticles of claim 1 wherein the average particle diameter of the microparticles is from 2 to 50 μm.

5. The microparticles of claim 1 wherein the average particle diameter of the microparticles is from 5 to 50 μm.

6. A micropowder having spherical particles possessing a virtually poreless surface structure said spherical particles consisting essentially of a polyarylene ether sulfone containing from 0 to 100 mol % of repeating units II

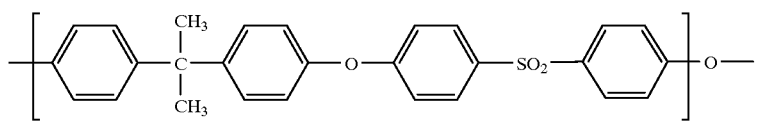

II (I$_2$)

and from 0 to 100 mol % of repeating units III

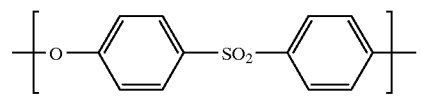

III (I$_2$)

and wherein the polyarylene ether sulfone has a number average molecular weight M$_n$ from 15,000 to 60,000 g/mol and a relative viscosity of from 0.25 to 0.95 dl/g as measured either in 1% strength by weight N-methylpyrrolidone solution, in a mixture of phenol and dichloromethane or in 96% strength sulfuric acid, in each case at 20° C. and 25° C., wherein the average particle diameter of said particles is from 2 to 70 μm.

7. The microparticles of claim 6 wherein the average particle diameter of the microparticles is from 2 to 50 μm.

8. The microparticles of claim 6 wherein the average particle diameter of the microparticles is from 5 to 50 μm.

9. A process for preparing the micropowder of claim 1 which comprises spray drying a solution of the polyarylene ether sulfone or of the polarylene ether ketone.

10. A micropowder of claim 9 wherein a) the solution is atomized by means of a pneumatic atomizer into a gas which is inert under the process conditions, b) the liquid droplets are dried in a drying chamber and c) the powder is separated from the gas stream.

11. A micropowder as defined in claim 10, wherein the solvent for the polyarylene ether sulfone or polyarylene ether ketone is methylpyrrolidone, dimethyl sulfoxide or dimethylformamide.

12. A micropowder as defined in claim 10, wherein the gas into which the solution is atomized is air or nitrogen.

13. A micropowder as defined in claim 10, wherein the pneumatic atomizer is a double-flow or triple-flow two-material nozzle.

14. A micropowder as defined in claim 10, wherein the pneumatic atomizer is a baffled double-flow or triple-flow two-material nozzle.

15. A micropowder as defined in claim 10, wherein the pneumatic atomizer is a double-flow or triple-flow two-material nozzle which is mounted both on the gas side and on the liquid side.

16. A micropowder as defined in claim 10, wherein the drying chamber is a drying tower.

17. A micropowder as defined in claim 10, wherein the drying chamber is supplied with a drying gas flowing in the direction of the liquid droplets.

18. A micropowder as defined in claim 10, wherein the separation of powder and gas is carried out by filters or cyclones.

19. A micropowder as defined in claim 10, wherein the spray drying comprises e) a subsequent drying procedure in a fluidized bed.

* * * * *